(12) United States Patent
Vangala et al.

(10) Patent No.: US 10,733,545 B2
(45) Date of Patent: *Aug. 4, 2020

(54) USER-CENTRIC CONTEXTUAL INFORMATION FOR BROWSER

(71) Applicant: Microsoft Technology LIcensing, LLC, Redmond, WA (US)

(72) Inventors: Vipindeep Vangala, Hyderabad (IN); Nishchay Kumar, Hyderabad (IN); Ankur Hayatnagarkar, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,186

(22) Filed: Oct. 4, 2018

(65) Prior Publication Data

US 2020/0110623 A1 Apr. 9, 2020

(51) Int. Cl.
| | | |
|---|---|---|
| *G06Q 10/06* | (2012.01) | |
| *G06F 16/951* | (2019.01) | |
| *G06F 9/451* | (2018.01) | |
| *G06F 3/0483* | (2013.01) | |

(52) U.S. Cl.
CPC ........... *G06Q 10/06* (2013.01); *G06F 3/0483* (2013.01); *G06F 9/453* (2018.02); *G06F 16/951* (2019.01)

(58) Field of Classification Search
CPC .............................. G06Q 10/06; G06F 16/951
See application file for complete search history.

(56) References Cited

U.S. PATENT DOCUMENTS

| | | | | |
|---|---|---|---|---|
| 8,275,399 | B2 * | 9/2012 | Karmarkar | H04M 1/72547 455/466 |
| 2013/0073509 | A1 | 3/2013 | Burkard et al. | |
| 2013/0159234 | A1 | 6/2013 | Xing et al. | |
| 2013/0275164 | A1 * | 10/2013 | Gruber | G10L 17/22 705/5 |
| 2013/0297689 | A1 * | 11/2013 | Bhat | G06F 17/2785 709/204 |
| 2014/0040748 | A1 * | 2/2014 | Lemay | G06F 3/167 715/728 |
| 2014/0358958 | A1 * | 12/2014 | Mandic | G06F 16/2428 707/769 |

(Continued)

OTHER PUBLICATIONS

"International Search Report and Written Opinion Issued in PCT Patent Application No. PCT/US2019/049408", dated Oct. 24, 2019, 15 Pages.

(Continued)

*Primary Examiner* — Ryan Barrett
(74) *Attorney, Agent, or Firm* — Shook, Hardy & Bacon

(57) ABSTRACT

A method for providing contextual information to a user during a browsing session includes maintaining a user-centric graph including a plurality of user-centric facts associated with the user and derived from interaction by the user with a plurality of different computer services. The method further includes recognizing a context of interaction with a browser application by a user. The method further includes identifying assistive information pertaining to the context, and displaying the assistive information to the user. The assistive information may be based at least on one or more user-centric facts in the user-centric graph.

20 Claims, 5 Drawing Sheets

(56) References Cited

U.S. PATENT DOCUMENTS

| | | | |
|---|---|---|---|
| 2015/0286698 A1* | 10/2015 | Gagnier | G06F 16/284 |
| | | | 707/736 |
| 2016/0085753 A1* | 3/2016 | Wong | G06F 16/951 |
| | | | 707/734 |
| 2016/0259775 A1* | 9/2016 | Gelfenbeyn | G06F 17/279 |
| 2016/0321573 A1* | 11/2016 | Vangala | G06Q 10/06 |
| 2016/0350321 A1* | 12/2016 | Garg | G06F 16/3322 |
| 2017/0289305 A1* | 10/2017 | Liensberger | H04L 67/02 |
| 2018/0096072 A1* | 4/2018 | He | G06F 3/0481 |
| 2018/0114111 A1* | 4/2018 | Gill | G06N 3/004 |
| 2018/0121098 A1* | 5/2018 | Gill | H04L 67/10 |
| 2018/0181345 A1* | 6/2018 | Vangala | G06F 3/0659 |
| 2018/0307746 A1* | 10/2018 | Du | G06F 17/277 |
| 2018/0329592 A1* | 11/2018 | Ramarao | G06F 3/0237 |
| 2018/0332169 A1* | 11/2018 | Somech | H04M 3/5166 |
| 2019/0098075 A1* | 3/2019 | Gill | H04L 67/10 |
| 2020/0110519 A1 | 4/2020 | Vangala et al. | |

OTHER PUBLICATIONS

Joly, et al., "Contextual Recommendation of Social Updates, a Tag-Based Framework", International Conference on Active Media Technology, Aug. 28, 2010, pp. 436-447.

"International Search Report and Written Opinion Issued in PCT Patent Application No. PCT/US2019/049402", dated Oct. 24, 2019, 14 Pages.

"Non Final Office Action Issued in U.S. Appl. No. 16/152,257", dated Oct. 2, 2019, 32 Pages.

\* cited by examiner

USER-CENTRIC CONTEXTUAL INFORMATION FOR BROWSER

BACKGROUND

Users frequently use browser software to access information sources (e.g., the Web, computer file systems, databases, libraries, etc.), to complete various tasks and engage in various activities. However, typical browsers are not configured to recognize, at a rich level of granularity, the context of usage (e.g., details about a current task or activity) in order to present information pertaining to tasks of interest. Instead, typical browsers present information related to a current document (e.g., web page, computer file, or database entry) being visited, without particular regard to the context of usage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for providing contextual information to a user during a browsing session includes maintaining a user-centric graph including a plurality of user-centric facts associated with the user and derived from interaction by the user with a plurality of different computer services. The method further includes recognizing a context of interaction with a browser application by a user. The method further includes identifying assistive information pertaining to the context, and displaying the assistive information to the user. The assistive information may be based at least on one or more user-centric facts in the user-centric graph.

DETAILED DESCRIPTION

The present disclosure is directed to a method for browser programs to provide contextual information to a user, e.g., to assist the user during a browsing session. Non-limiting examples of browser programs include desktop, web, mobile phone, and/or other computer services configured to browse through and access a plurality of content items, e.g., multimedia content, web pages, or any other data. Non-limiting examples of browsing may include 1) viewing a listing of content organized in any suitable manner (e.g., organized by a file location or web address), 2) searching by content and/or metadata (e.g., by content type, by natural language contents, by text strings and/or patterns, by image content, etc.), 3) accessing files from a listing and/or search (e.g., displaying an image from a search result), and/or 4) accessing/viewing curated, suggested or otherwise retrieved content. For example, browser programs include web browsers, filesystem browsers, as well as browsing software configured for accessing library records, medical records, financial data, news archives, and/or any other suitable information which may be stored/organized in a browsable manner.

Figure 1A:
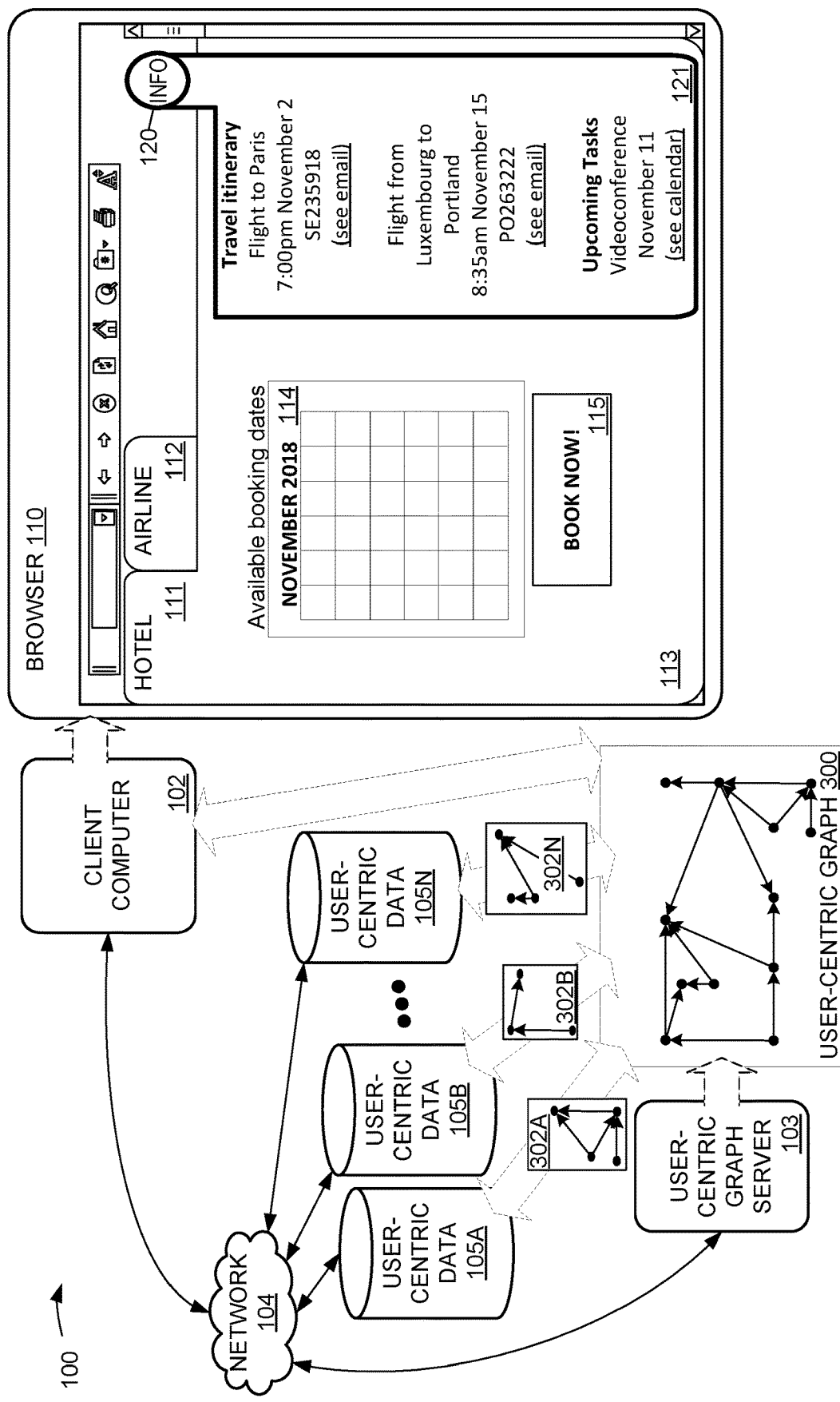
FIG. 1A shows an exemplary computer system for providing user-centric contextual information in a browser.

The present disclosure improves the technology of browser programs, including improvements to browser UI and improvements to browser backend. In particular, the present disclosure includes a method for a browser to present a user with assistive information related to a current interaction context of the user, which may be useful for various reasons, such as to assist the user in finding information of interest, engaging in activities of interest, and/or completing tasks using the browser. By presenting the user with relevant information that may facilitate completion of a task, the efficiency of task completion by the user and the computational efficiency of the browser may be improved. For example, the user may be able to complete a task more quickly and/or with fewer interactions with the browser, by utilizing contextual information presented by the browser in lieu of extensive additional searching/browsing. In some examples, the assistive information may be relevant to potential future steps of a task, so the user may be able to plan ahead and complete the task more efficiently by considering the information related to future steps. Similarly, fewer computational steps and/or less network communication may be required by the time the user has completed the task, e.g., the browser may be able to batch together relevant information from multiple different sources and efficiently deliver the batched information to the user, in lieu of the user making multiple requests to get each individual piece of information. Furthermore, according to the present disclosure, information relating to user interaction with different computer services may be aggregated in a common user-centric graph, thereby reducing the need for multiple different queries (e.g., associated with different computer services) to access the relevant information. The aggregation of relevant information from multiple different computer services may enable an intelligent, automatic presentation of assistive information that the user can utilize in lieu of making multiple manual queries associated with multiple different computer services. For example, if a user's task may be assisted by receiving the top search result for each of 3 different web searches, the browser may be able to anticipate that the user would likely conduct each of the 3 web searches in the near future, in order to present said 3 top search results, instead of waiting for the user to make each of the 3 different web searches and presenting other, less relevant results of each search. FIG. 1A shows an exemplary computing system 100 including a client computer 102. Client computer 102 may be any suitable computing device, e.g., a desktop computer or mobile phone device. Client computer 102 is configured to instantiate a browser 110. As shown in FIG. 1A, browser 110 may be provided as a GUI program including visual elements for viewing/navigating information sources. When browser 110 is to be provided as a GUI, client computer 102 may include and/or operatively couple to one or more display devices configured to visually present browser 110. Although examples are discussed in terms of a browser including a GUI for display, in other examples, a browser 110 may include other user interface elements (e.g., text, natural language, speech audio, and/or user interfaces configured for interaction with a user via any other suitable state-of-the-art and/or future input devices).

For example, in FIG. 1A, browser 110 is a web browser displaying two content tabs 111 (with title indicating a page related to a hotel) and 112 (with title indicating a page related to an airline). Although examples are discussed in terms of a web browser, browser 110 may alternately or additionally include any other kind of browser, e.g., a filesystem browser. Content area 113 shows visual content associated with first content tab 111, namely booking information for a hotel including a booking date calendar 114 and a "BOOK NOW!" button 115. Browser 110 further includes an assistive information button 120 configured to indicate when contextual information is available for assisting the user and selectable to display an information pane 121 configured to display such contextual information. Contextual information displayed in information pane 121 may include any suitable information for assisting the user with a task and/or activity they may be engaged in. For example, in FIG. 1A, information pane 121 shows contextual information related to the user's travel plans, which may assist the user with deciding on an available booking date using calendar 114. Information pane 121 may additionally or alternately show further information not shown in FIG. 1A. For example, when a context is related to travelling, information pane 121 may show further information related to future and/or historical trips. In an example, a user may have gone to the same location in a previous trip in a previous year. Accordingly, information pane 121 may present relevant information from the previous trip. For example, information pane 121 may include an automatic suggestion to go to a web site associated with a hotel at which the user stayed during the previous trip. For example, information pane 121 may show one or more photos and/or links to photo/video albums associated with the user's previous trip.

To provide relevant assistive information to facilitate easier completion of the task, computing system 100 intelligently recognizes a context of user activity. Non-limiting examples of contexts include 1) a task and/or activity (e.g., a current task the user is engaged in, a recent task the user completed, and/or a future task the user has scheduled and/or made a commitment to perform); 2) the state of being engaged in an ongoing and/or long-term commitment (e.g., a job, a class, and/or a project) 3) a collection of related tasks, activities, web sites, snippets of information, web searches, contact information for collaborators, documents, etc., relating to a particular endeavor such as research and development, academic or scholastic studies, etc.; and/or 4) a predefined topic of interest to the user and/or a topic recognized based on recent, current, and/or historical activity of the user (e.g., a favorite television show, a current research topic).

Computing system 100 may use personal information of the user arising from user interaction with the browser and/or with any of a plurality of other computer services, in order to recognize a current context of the user. For example, the current context of the user may be recognized based on a collection of user-centric facts derived from the user interaction with the browser and/or other computer services. Similarly, the listed assistive information that is provided to a user in response to a recognized context may be drawn from any combination of user interactions with the browser and/or other computer services. "Computer service" may refer herein to software applications executable on computer systems (e.g., including networked computing systems, cloud computing, and the like), hardware and/or software products, and/or any other machines or processes configured to provide interactive and/or non-interactive services to one or more users, in order to assist the user(s), edit, transform, store, and/or maintain data, interact with other computer services, and the like. The other computer services may include web-based, desktop, and/or mobile phone applications, smart home devices/"Internet of Things" devices, intelligent assistant devices, wearable devices, background services, etc. Non-limiting examples of computer services from which personal information may be derived include: 1) an intelligent assistant program; 2) an email program; 3) an office suite program (e.g., word processor, slideshow, spreadsheet program); 4) a calendar program; 5) a teleconferencing program; 6) a task tracking program; 7) a health/activity/nutrition tracking program; 8) a multimedia program (e.g., television/video, music, and/or video game content delivery program); 9) a diagramming/publishing program; 10) an integrated development environment for computer programming; 11) a social network service; 10) a workplace collaboration environment; and 11) a cloud data storage and file synchronization program.

As indicated above, the user browser context and assistive information provided in response to that context may be derived from user-centric facts from various sources, e.g., from data sources associated with one or more different computer services. Accordingly, computer system 100 may include a user-centric graph server 103 configured to instantiate, maintain, and/or store a collection of user-centric facts as a user-centric graph data structure 300. User-centric graph structure 300 represents a plurality of user-centric facts in the form of nodes and edges in a graphical data structure. Structural characteristics of user-centric graph structure 300 may indicate facts and/or possible relationships between facts. User-centric graph structure 300 may represent each fact as a subject-predicate-object triple including a subject graph node representing a subject of a fact (e.g., an entity, event, or any other noun), an object graph node representing an object of a fact, and an edge representing a predicate that describes a relationship between the subject and the object. Furthermore, user-centric graph structure may represent relationships between facts, e.g., two or more facts may share a common subject and/or object. Relationships between subjects, objects, and facts in the graph may be encoded as nodes, edges, and/or paths in the graph which may represent relationships indicating a common entity, temporality, and/or topic of facts, as well as any other suitable relationships. The user-centric graph structure may be useable to derive inferences from one or more facts, e.g., by traversing the graph along paths formed by edges of the user-centric facts.

The user-centric graph may be utilized by any computer service, e.g., to store user-centric facts arising from user interaction with the computer service, and/or to query the user-centric graph to recognize one or more user-centric facts related to interaction with that computer service or any other computer service(s). Computer services which utilize the user-centric graph may be $1^{st}$ party computer services authored and/or administered by an organization or entity which administers the user-centric graph, or $3^{rd}$ party services authored and/or administered by a different organization or entity. Computer services may utilize the user-centric graph via one or more APIs of the user-centric graph (e.g., an update API and a query API), wherein each API is useable by a plurality of different computer services including $1^{st}$ party computer services and $3^{rd}$ party services.

A user may interact with a computer service using more than one different device, e.g., via user interfaces for a mobile device, a desktop computer, an intelligent-assistant speaker device, etc. Relevant user-centric facts may be aggregated from computer services at each different device with which a user interacts. For example, a user may interact with a particular computer service (e.g., email program) at more than one different device (e.g., via a mobile phone with a mobile phone email application, and via a personal computer device via a web-browser based email client). Accordingly, the various computer services may use and/or contribute to the user-centric graph 300, irrespective of which specific device a user may use to interact with the computer services. For example, although browser 110 is shown associated with a client computer 102 in FIG. 1A, it will be understood that browser 110 may be instantiated on any suitable device, e.g., a personal computer, a mobile phone, an intelligent assistant device, etc. Accordingly, browser 110 may present assistive information based on user-centric facts, irrespective of which device instantiated browser 110. Because any suitable computer service, running on any suitable device, may use user-centric graph 300 to derive assistive information, the presentation of assistive information is agnostic to the particular device instantiating browser 110 and/or any other computer service(s). Accordingly, the user may be presented with assistive information in a consistent fashion, across different devices running browser 110 or any other browser program.

The user-centric graph server 103 and/or client computer 102 may connect, via network 104, to one or more user-centric data stores, e.g., user-centric data 105A, 105B, and optionally any suitable number of further user-centric data stores through user-centric data 105N. Each user-centric data store may store any suitable data which may be pertinent to the user, e.g., data arising from interaction with one or more computer services. For example, each user-centric data store may be an application-specific data store which stores data pertaining to an application such as user data, configuration settings, and the like.

The user-centric graph data structure 300 includes a plurality of different constituent graph structures 302, e.g., constituent graph 302A, constituent graph 302B, etc, through constituent graph 302N Each constituent graph structure may be an application-specific constituent graph structure associated with a different computer service, e.g., graph structure 302A associated with user-centric data from a first computer service stored in user-centric data 105A. For example, application-specific constituent graph structure A may be associated with a schedule planning program, while application-specific constituent graph structure B may be associated with an email program. The multiple constituent graphs may be treated as a single graph by regarding edges between constituent graphs as edges in a single larger graph 300. To simplify explanation, the depicted graph only includes twelve nodes. In actual implementations, a user-centric graph will include many more nodes (e.g., hundreds, thousands, millions, or more) spread between many more constituent graphs.

User-centric graph server 103 may further connect, via network 104, to any other suitable computer devices and/or computer networks, e.g., computers on the Internet such as web search providers, web site hosts, etc. In some examples, user-centric graph 300 may be configured to include one or more external facts derived from such other computer devices in addition to user-centric facts pertaining specifically to a user. For example, user-centric graph 300 may include one or more facts derived from a web search result and/or web site. When user-centric graph 300 includes external facts, the external facts may be related to user-centric facts in the user-centric graph in any suitable manner, e.g., user-centric graph may include one or more nodes and/or edges which represent global data derived from the Internet, which are connected via paths in the graph to one or more nodes and/or edges representing user-centric data arising from user interaction with a computer service. In some examples, connections between user-centric facts and external facts can create additional/enhanced user-centric facts.

Client computer 102 may communicate, via network 104, with user-centric graph server 103 to leverage information represented in the user-centric graph, in order to assist a user. For example, such assistance may include answering questions for and/or about the user by retrieving user-centric and/or external facts, looking up historical data pertaining to interactions between the user and one or more computer services, and/or inferring new facts to add to the user-centric graph.

As shown in FIG. 1A, browser 110 may utilize personal information of the user from one or more emails and/or calendar/scheduling items, as shown in information pane 121. Information pane 121 can show information related to any one or more suitable contexts (e.g., related to tasks the user may wish to complete). A context may be based on one or more user-centric facts in the user-centric graph. For example, a context may be based on a cluster of user-centric facts that are mutually connected by edges within the user-centric graph. Alternately or additionally, a context may be based on one or more user-centric facts within the user-centric graph that adhere to a particular constraint, e.g., matching a particular topic, relating to a particular entity or event, or having a particular temporality (e.g., facts describing events occurring within a particular duration of time, with a particular periodicity or schedule, or any other suitable temporal relationship). Non-limiting examples of user-centric facts that may be included in the context are user-centric facts describing: 1) emails to or from the user; 2) contacts of the user; 3) calendar data of the user; 4) documents (e.g., including multimedia documents such as photos, videos, or any other content being curated, edited, and/or originated by the user); 5) web pages; and/or 6) location data associated with the user (e.g., location data measured by sensors of a device belonging to the user, and/or location data inferred from interaction with a computer service by the user); and/or 7) application usage data associated with the user (e.g., login data, usage statistics concerning usage frequency and duration, etc.; for example, application usage data may include browser usage data of 110 including recent page visits, search history, etc.).

A context in the user-centric graph may indicate further user-centric facts in the user-centric graph 300, e.g., user-centric facts that are connected via edges/paths in the user-centric graph 300 to one or more user-centric facts of the context. For example, a first user-centric fact in the context may be the fact that the user received a first email from an airline booking confirmation email address. A second user-centric fact in the context may be the fact that the user received a second email from the same airline (e.g., as indicated by the second email being from the same or a similar email address as the first email). Accordingly, the two user-centric facts may be connected in the user-centric graph based on both emails being from the same airline. In addition to connections in the user-centric graph based on a common identifier such as an email address, further examples of connections in the user-centric graph, based on topical, temporal, and/or other constraints will be discussed below.

The user-centric graph 300 may be traversed and/or processed to retrieve one or more user-centric facts related to the context. Traversing and/or processing the user-centric graph 300 may be based on structure of the user-centric graph 300 and/or details of user-centric facts within and/or related to the context.

For example, the user-centric graph 300 may be traversed by performing a random walk through the user-centric graph 300, starting with an initial set of one or more user-centric facts in the context and traversing further user-centric facts that are connected to those in the initial set, to build up a larger set of potentially relevant user-centric facts. Randomly walking through the graph may be weighted based on relationships between the user-centric facts, e.g., details associated with subject graph nodes, object graph nodes, and/or edges of the user-centric facts. For example, user-centric facts may be annotated with confidence scores which may be used to weight the random walk.

In addition to performing random walks based on confidence values associated with nodes and/or edges in the user-centric graph, the user-centric graph may be traversed and/or processed in any other suitable fashion. Non-limiting examples of processing may include 1) "ranking" user-centric facts in the graph according to a scoring function and retrieving relatively higher-ranked user-centric facts (e.g., finding user-centric facts about the most relevant entities with regard to the context), and 2) "slicing" the user-centric graph to filter user-centric facts that satisfy a particular constraint (e.g., finding email-related user-centric facts that are connected to the context). "Ranking," "slicing," and other approaches to traversing/processing the user-centric graph will be described in further detail below with regard to FIGS. 4A-4D.

The displayed assistive information in pane 121 may be based on user-centric facts in the context, and/or user-centric facts retrieved from user-centric graph 300 based on the context. For example, the assistive information in pane 121 may include a natural language representation of each of the one or more user-centric facts, and/or a natural-language summary of the one or more user-centric facts. In some examples, the assistive information may include a user-centric fact related to completing a task and/or topic related to the context. In some examples, the assistive information may include a summary of historical activity by the user related to the context.

In addition to being based on user-centric facts, the displayed assistive information may be further be based on external and/or derived facts. Non-limiting examples of external and/or derived facts upon which the assistive information may be based include: 1) results of a web search related to the user-centric facts, 2) dictionary/encyclopedia/reference information related to the user-centric facts, 3) website content related to the user-centric facts, and/or 4) results of processing the user-centric facts according to programmatic, mathematical, statistical, and/or machine learning functions (e.g., computing a date or duration based on dates associated with user-centric facts in the context, for example, to suggest a possible scheduling of a future task; computing a natural-language summary or an answer to a query using a machine learning model; etc). Non-limiting examples of information that may be present within the assistive information includes information based on (e.g., summarized, inferred, and/or otherwise determined from) one or more of 1) emails to or from the user; 2) contacts of the user; 3) calendar data of the user; 4) documents; 5) web pages; 6) location data associated with the user; and/or 7) application usage data associated with the user.

Browser 110 may be configured to present information related to one or more of a plurality of pre-defined contexts, e.g., "travel" and "upcoming tasks." For example, as shown in FIG. 1A, information pane 121 shows assistive information related to a travel itinerary and upcoming tasks from the user's calendar. Alternately or additionally, browser 110 may be configured to intelligently recognize one or more contexts of particular relevance to a user, based on personal information of the user. For example, even when browser 110 may not be configured to present contextual information about a "travel" topic, browser 110 may nonetheless recognize "travel itinerary" as a relevant context of the user, e.g., based on the user's email and/or calendar data.

By presenting relevant assistive information responsive to the determined context (including relevant flight dates from emails to the user, and an upcoming scheduled task from the user's calendar), the browser may help the user to determine a suitable hotel booking date from available dates in calendar 114, without requiring the user to separately find the user's personal email and calendar data. Accordingly, the user may be able to complete a selection in calendar 114 and confirm the selection with button 115, without needing to redirect attention to intermediate steps such as opening up an email program and finding a relevant email, and/or opening up a calendar program and navigating to relevant dates. In the present example, presenting the flight dates and upcoming tasks may save the user several steps. For example, the user may be aware that they have scheduled a videoconference sometime during the trip and may need to plan to be at a hotel with wireless internet during the scheduled time, but may not remember the exact dates of the trip. Accordingly, to plan the hotel booking, the user may need to figure out the flight dates (e.g., from relevant emails), then check the calendar during the relevant dates. As shown in FIG. 1A, computing system 100 may intelligently determine that the user may require the relevant information from emails/calendar and present assistive information related to the context in information pane 121, thereby allowing the user to avoid the steps of searching email for the relevant flight booking and then searching a calendar during the relevant duration.

In some examples, a context for triggering assistive information may be defined by a collection of user-centric facts related to the context, e.g., tasks, emails, contact info, web sites, web searches, file/database searches, historical browser activity, historical activity in other applications, etc. In some examples, the collection of user-centric facts may include information content that is semantically related, e.g., a collection of user-centric facts defining a context for a predefined topic may include user-centric facts that are each semantically related to the topic. For example, when a predefined topic is "travel," the collection of user-centric facts may include emails, web searches, etc., that each include semantic data and/or metadata related to travel. Non-limiting examples of semantic data include natural language content, image content, text, numerical data, etc. Non-limiting examples of metadata include file/web/database locations, publication dates, access times, authorship information, sender/recipient information, etc.

In some examples, a context may be defined by a collection of user-centric facts that are related by a temporal relationship, based on the user-centric facts being associated with related date/time information. A collection of user-centric facts defining a context based on a temporal relationship may be recognized, even if the collection of user-centric facts would not otherwise be recognized as defining a context based on a task/activity, ongoing project, predefined topic, and/or topic based on recent activity. Non-limiting examples of contexts based on temporal relationships include: 1) a co-occurring collection of web sites, emails, etc., that were accessed by the user simultaneously or within a short duration of each other; 2) an activity with an associated scheduled time (e.g., a due-date for a project or a scheduled appointment), along with one or more other activities that occurred or are scheduled to occur soon before or after the scheduled time; 3) a recurring temporal context, e.g., every evening, every Tuesday at 5:00 PM, or any other suitable scheduled and/or periodic occurrence.

For example, when a user is travelling, they may also need to participate in a scheduled teleconference. Accordingly, a "travel" context may also include the temporally-related information for the teleconference schedule, since the scheduled date for the teleconference occurs within the travel dates, even if the teleconference schedule would not otherwise be recognized as being semantically related to the travel itinerary.

Recognizing a context for triggering assistive information may include combining multiple different signals, e.g., metadata, semantic content, and temporal relationships, to assess a strength of relationship between different user-centric facts. If a collection of user-centric facts is related in more than one different way (e.g., similar topic, as well as a temporal relationship), it may represent a more significant context for the user. In some examples, the presence of multiple signals may allow the recognition of a context that would otherwise not be recognized.

Figure 1B:
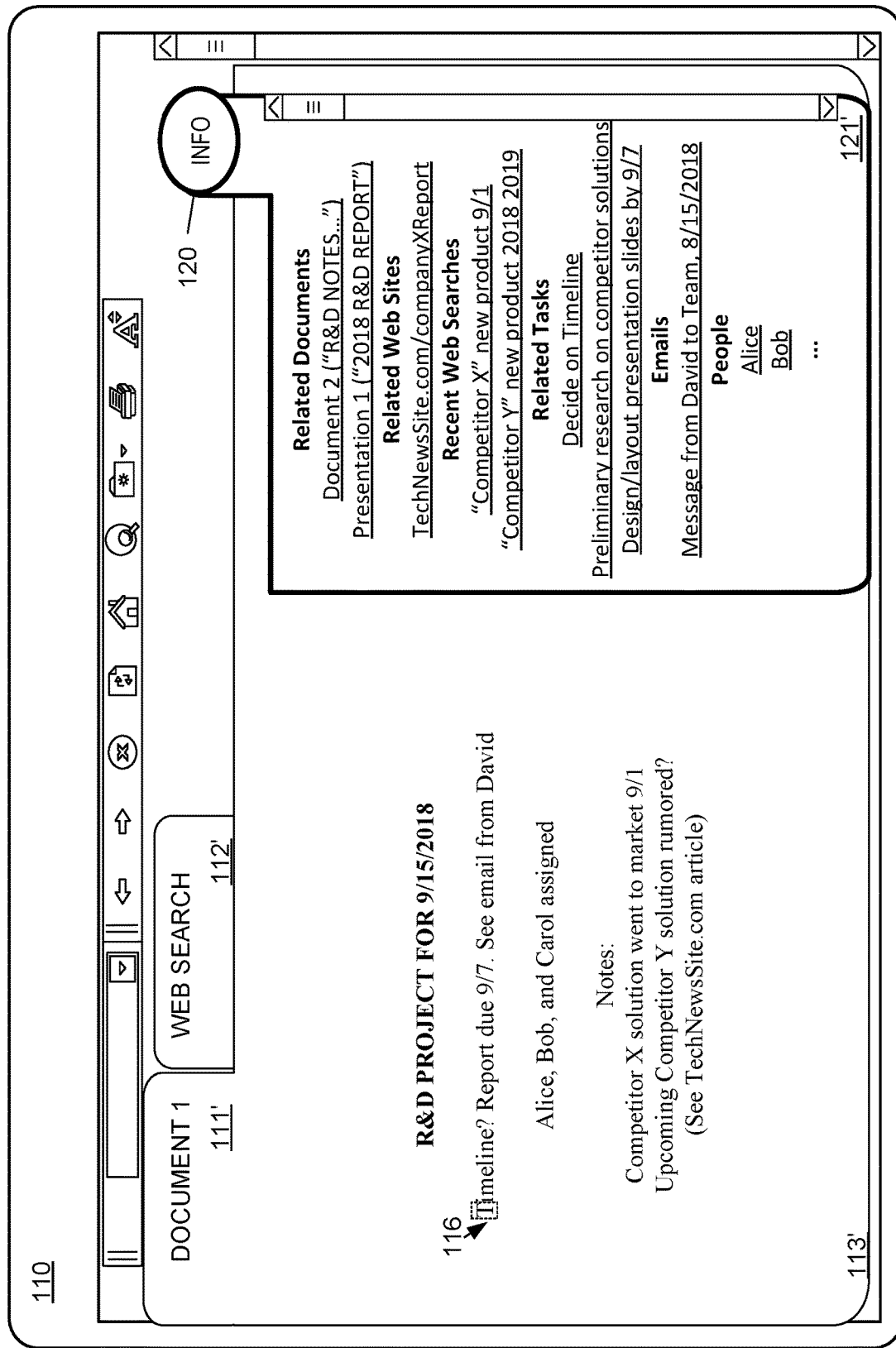
FIG. 1B shows a further example of a user context in which a browser provides user-centric contextual information.

FIG. 1B shows another example of a browser session in which a user is currently editing a document in browser 110 via an in-browser editor, as shown in tab 111' displaying "DOCUMENT 1." In the exemplary session, the user also recently interacted with a web search tool in tab 112' marked "WEB SEARCH." The currently displayed tab 111' includes page content 113' in the form of an editable interface. The editable interface may allow the user to edit and save displayed content, e.g., using a word processing GUI including a cursor 116 for selecting a position and/or range in the text. As shown, the "DOCUMENT 1" contents shown in page content 113' include user-defined text describing an "R&D PROJECT" and including various notes about the project logistics, e.g., noting that Alice, Bob, and Carol are assigned to a project that is due on the date 9/7 according to an email from David.

Based on page contents 113' and recent interactions between the user and one or more other applications, info button 120' may indicate that information pane 121' of assistive information is available for a current context. The current context may be defined by user-centric facts relating to any suitable information about the user's interaction with the browser, for example, user-edited contents in page content 113', previous interactions between the user and the browser such as web searches conducted via tab 112', other historical web site visits and/or web searches, and/or recent interactions between the user and other applications, such as other document editing applications, email applications, and/or scheduling applications. In particular, the current context may be defined by one or more user-centric facts related to the "R&D PROJECT." As shown in information pane 121', assistive information related to the "R&D PROJECT" is displayed based on such context, e.g., so as to potentially assist the user with completing one or more tasks related to the R&D project.

The assistive information shown in information pane 121' may include any suitable information which may be relevant to the context. For example, information pane 121' includes: 1) a listing of related documents that the user may wish to view and/or edit to complete the R&D project; 2) a related web site describing a competitor's approach; 3) related web searches pertaining to the competitor's approach; 4) related tasks that the user may wish to complete in order to complete the R&D project; 5) related emails pertaining to the project; and 6) people who the user may wish to contact pertaining to the project.

For example, related emails may be determined by one or more user-centric facts defining the context based on user interaction with an email application. Related documents may be determined by one or more user-centric facts in the context that were based on user interaction with the browser (e.g., with a document editor displayable in the browser such as in page content 113') and/or with any other computer services (e.g., with a dedicated word processor or slide presentation program). Similarly, the listed people may be determined based on emails to and/or from the user, collaborators who also edited a related document, and/or people listed in a contact list of the user. By identifying a context and relevant documents, tasks, web sites, web searches, tasks, emails, and people, browser 110 may be able to facilitate easier completion of the R&D project, since the user may be able to access relevant information from information pane 121' instead of explicitly consulting various sources of information (e.g., documents, contact lists, emails, etc.). Accordingly, the user can find and use relevant information from multiple different sources, without diverting attention from working on "DOCUMENT 1" in tab 111'.

Similarly, a collection of user-centric facts defining a context for a topic based on recent activity may include user-centric facts that each relate to one or more common topics. Determining that user-centric facts belong in a collection defining a particular context may also be based on any other suitable information related to the user-centric facts, e.g., metadata and semantic content of the user-centric facts.

Figure 2:
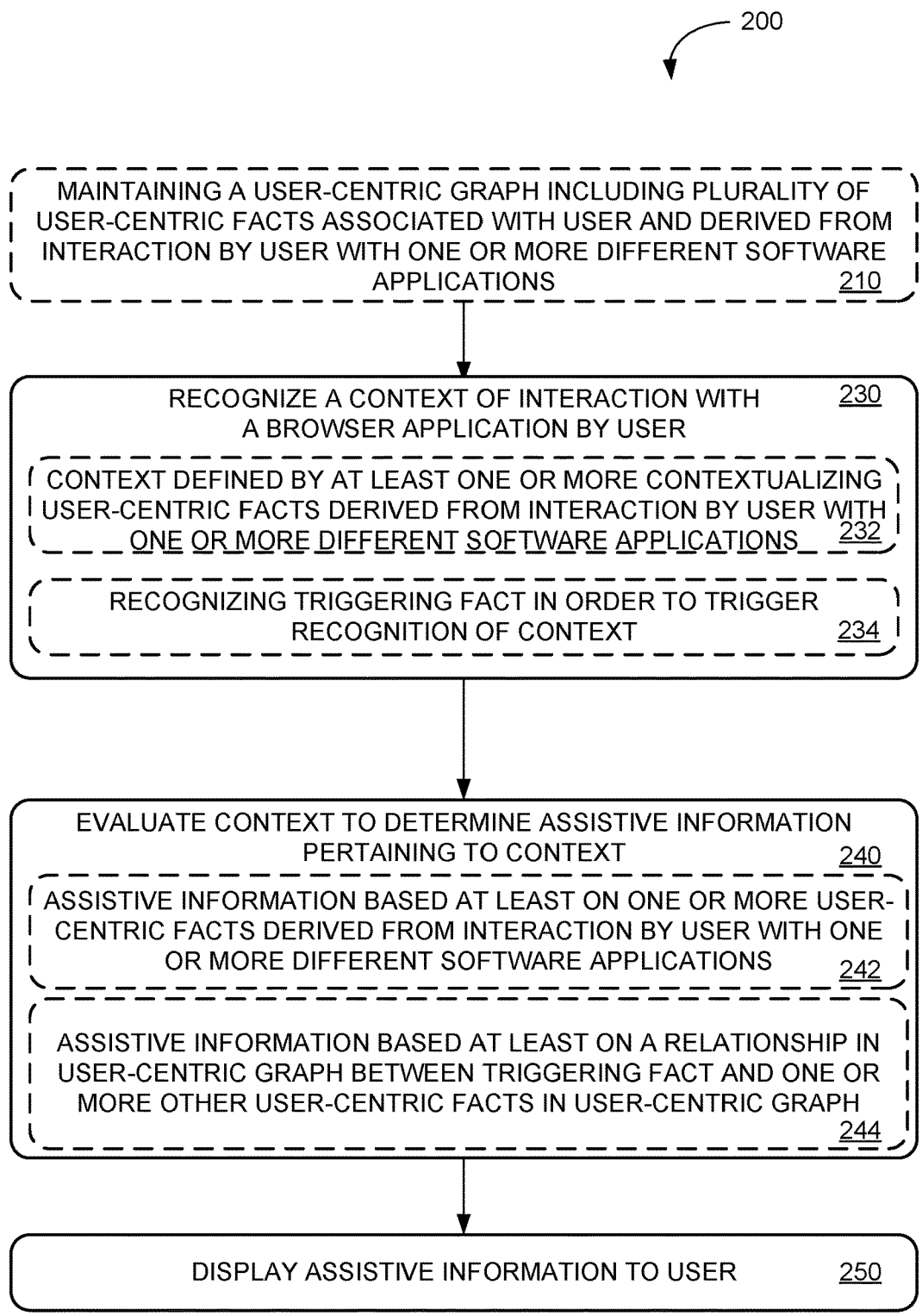
FIG. 2 shows a method of providing user-centric contextual information in a browser.

FIG. 2 shows an exemplary method 200 for providing contextual information in a browser to assist a user. Method 200 includes, at 210, maintaining a user-centric graph including a plurality of user-centric facts associated with a user. The user-centric facts may be derived from interaction, by the user, with one or more different computer services.

Method 200 may be performed by any suitable combination of devices of FIG. 1A. For example, method 200 may be performed by executing code stored at one or more storage devices associated with any of the devices of FIG. 1A, on one or more processors of any of the devices of FIG. 1A. Furthermore, the processors and/or storage devices of devices shown in FIG. 1A may be operated in any suitable combination to instantiate user-centric graph 300 and/or browser 110. For example, browser 110 may include a graphical user interface visually presented at a display device of client computer 102, and processing functionality provided by any combination of client computer 102 and other devices of FIG. 1A. Operating browser 110 at client computer 102 may generally include 1) gathering information related to user interaction with browser 110 that is useable to define and/or infer a context in user-centric graph 300, 2) sending such information to one or more other devices of FIG. 1A (e.g., to user-centric graph server 103), 3) receiving responses from the one or more other devices, wherein the responses include assistive information based on the context, and 4) visually presenting the responses in the GUI for browser 110.

At 230, method 200 further includes recognizing a context of interaction with a browser application by the user. Optionally, at 232, the context is defined by at least one or more contextualizing user-centric facts derived from interaction, by the user, with one or more different computer services. Optionally, at 234, recognition of the context is triggered by recognition of a triggering fact. The triggering fact may be any user-centric fact, or any other fact (e.g., a fact derived from a web site being visited by the user). The context may be based on the triggering fact in any suitable manner. For example, the context may be defined by a single user-centric fact, namely, the triggering fact. Alternately or additionally, the context may be defined by one or more facts that are related to the triggering fact in any suitable manner (e.g., via structural relationships of the graph, common topics/tasks/entities/events, etc., as described above). For example, the context may be defined by a temporal relationship between the triggering fact and one or more other user-centric facts in the graph (e.g., based on a temporal relationship between a date associated with a user interaction defining the triggering fact and/or other user-centric facts, a due-date associated with a user-centric fact, etc.).

The triggering fact may be based on one or more previous interactions (e.g., recent and/or historical interactions), by the user, with the browser or any other computer service(s). For example, user centric graph server 103 may be configured to receive, from browser 110, a computer-readable description of one or more previous interactions, by the user, with the browser. Accordingly, the triggering fact may include such computer-readable description of the previous interaction(s). Non-limiting examples of interactions between the user and the browser include: 1) metadata and/or content corresponding to a recent file location and/or web site visited by the user; 2) a recent file and/or web search query submitted by the user; 3) content input by the user in a web form, editable document, or via any other input mechanism provided by the browser; 4) closing one or more tabs, windows, or other interface elements of the browser; 5) clicking on an information button to request information (e.g., clicking on button 120 of browser 110); 6) viewing location/search history in the browser; 7) adding a new bookmarked (e.g. "favorite") page and/or viewing a listing of bookmarked pages; 8) interacting with a web site or any other computer service (e.g., placing an order to purchase a product, booking a reservation, sending and/or reading an email via an email client accessible via the browser, etc.); and/or 9) a previous interaction, by the user, with a computer service other than the browser (e.g., an email or calendar program).

In some examples, the browser may continually recognize potential triggering facts arising from user interaction with the browser, in order to determine whether, for each candidate triggering fact, assistive information should be presented based on a context related to the triggering fact. For example, recognizing the context may include assessing, for a candidate triggering fact, a signal strength estimating a relevance of the triggering fact and/or context(s) related to the triggering fact. The signal strength may be based on the triggering fact and/or a context related to the triggering fact. In some examples, assessing a signal strength may be based on a confidence value associated with the triggering fact and/or other user-centric facts in a context relating to the triggering fact.

In some examples, assessing a signal strength may be based on one or more graph-theoretic characteristics or other structural properties of the user-centric graph, e.g., an amount of clustering or connectivity of the context relating to the triggering fact. Non-limiting examples of graph-theoretic characteristics that may be suitable for assessing a signal strength include 1) connectivity, e.g., number of connected components and/or k-connected components for any suitable value of k such that k vertices need to be removed to disconnect the k-connected components); 2) path distance; 3) presence and/or absence of cycles; 4) graph-theoretic strength and/or toughness; and/or any other suitable graph-theoretic properties. In some examples, browser 110 may recognize a triggering fact and display assistive information only for candidate triggering facts and contexts for which a relatively high signal strength is assessed. For example, recognizing the triggering fact may include assessing, for a candidate fact, a signal strength score indicating a strength of relationship between the candidate fact and user-centric facts in the user-centric graph, and recognizing the triggering fact responsive to the signal strength score exceeding a threshold. Alternately or additionally, recognizing the triggering fact may include recognizing, as the triggering fact, a candidate triggering fact having a highest signal strength among a plurality of triggering facts occurring in user interaction with the browser.

In an example, a context relating to a predefined topic may be defined by at least one node in the user-centric graph which has outgoing edges connected to one or more other nodes based on the one or more other nodes each pertaining to the predefined topic. In an example, a context defined by a topic may be recognized based on structural properties of one or more user-centric facts in the user-centric graph, e.g., based on graph theoretic characteristics such as the user-centric facts forming a dense cluster, or any other suitable graph-theoretic characteristics as described above with regard to assessing signal strength for a triggering fact.

At 240, method 200 further includes evaluating the context to determine assistive information pertaining to the context. Optionally, at 242, the assistive information is based at least one or more user-centric facts derived from interaction, by the user, with one or more different computer services. Optionally, at 244, the assistive information is based at least on a relationship, in a user-centric graph, between a triggering fact and one or more other user-centric facts in the user-centric graph. In some examples, after recognizing a triggering fact, user-centric graph 300 may be updated to include the triggering fact. In some examples, responsive to recognizing a triggering fact, user-centric graph 300 may be updated to include one or more additional user-centric facts based on aggregating, summarizing, and/or otherwise analyzing other user-centric facts in user-centric graph 300. For example, if the user is frequently interacting with travel-related websites as shown in FIG. 1A, user-centric graph 300 may be updated to include an additional user-centric fact summarizing the user's interactions by stating that "the user frequently researches travel." This new user-centric fact may be related, via paths in the user-centric graph 300, to other user-centric facts relating to travel. The new user-centric fact may define a context which may be used to return assistive information to the user, e.g., a "travel" topic context with related assistive information including previous travel-related interactions by the user, as well as other general information related to travel (e.g., travel web sites, travel-related web searches, etc.).

At 250, method 200 further includes displaying the assistive information to the user. The assistive information can be displayed in any suitable fashion. For example, as shown in FIG. 1A-1B, the assistive information may be displayed as a listing of facts grouped into different categories, e.g., "Travel Itinerary," "Upcoming Tasks," "Related Documents," "Websites," "Web Searches," "Tasks," "Emails," and "People" categories as shown in FIGS. 1A-1B. By recognizing the context of the user and displaying the assistive information related to that context, the browser may facilitate easier completion of tasks pertaining to the context. Accordingly, method 200 may improve the efficiency and/or ease of use of one or more computers.

Figure 3A:
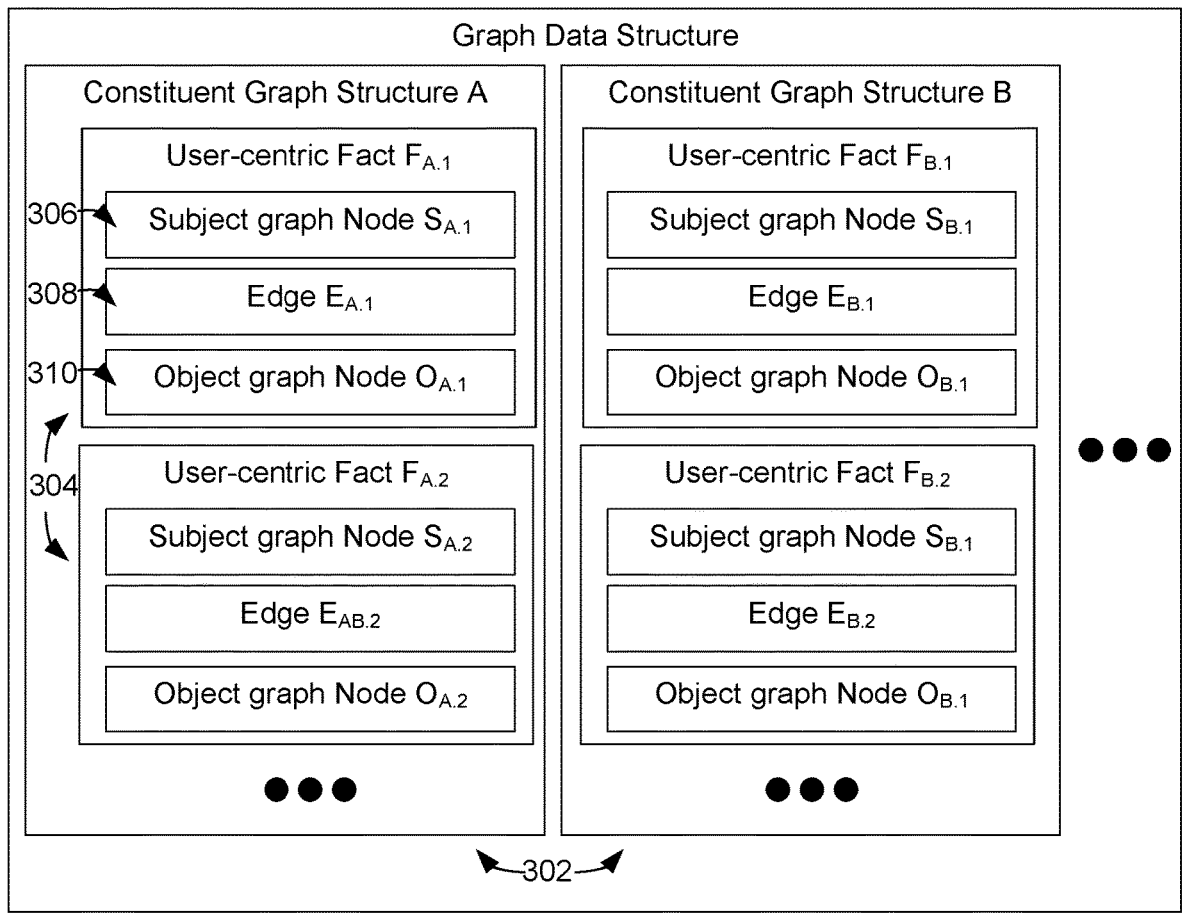
FIGS. 3A-3B show an exemplary user-centric graph data structure for storing a collection of user-centric facts.
Figure 3B:
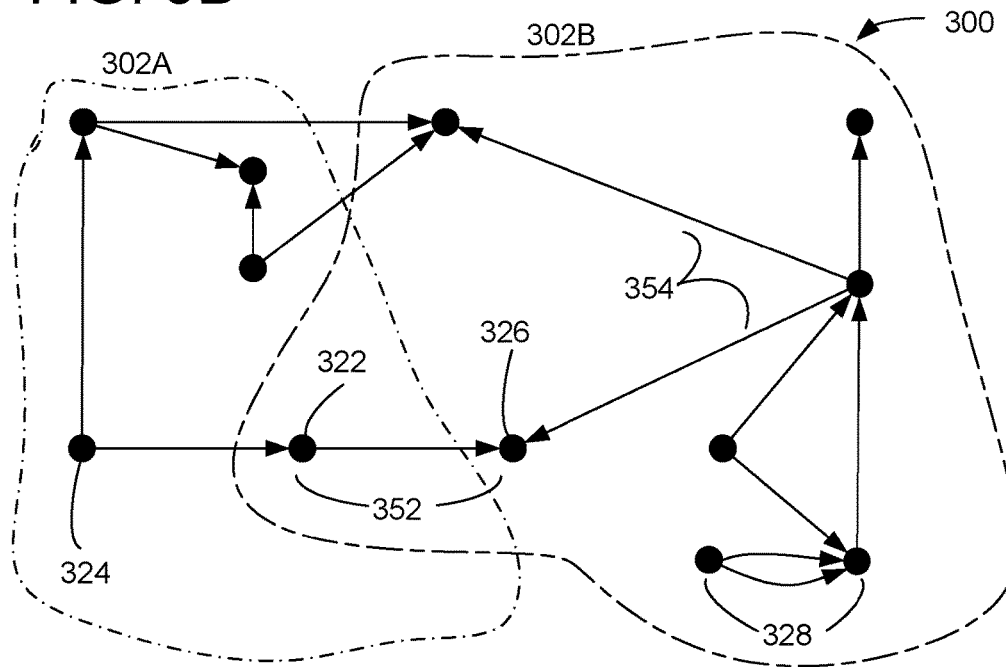

FIGS. 3A-3B show details of an exemplary graph data structure for representing a collection of user-centric facts as a user-centric graph. FIG. 3A shows exemplary graph data structure 300 in more detail in the form of a computer-readable data format 300' for the graph data structure 300. Graph data structure 300 represents a collection of user-centric facts in data format 300' or any other suitable data format. The user-centric facts may be associated with application-specific data distributed across a plurality of different computer services. The graph data structure 300 allows centralized queries and is suitable for implementing a user-centric graph.

Graph data structure 300 may be distributed across one or more application-specific constituent graph structures (e.g., corresponding to different computer services), such as constituent graph structure 302 indicated in a first region surrounded by a broken line, A, constituent graph structure 302B indicated in a second region surrounded by a different broken line, and other constituent graph structures not shown in FIG. 3A.

Each constituent graph structure includes a plurality of user-centric facts 304, e.g., user-centric facts $F_{A.1}$, $F_{A.2}$, etc. stored in constituent graph A, and user-centric facts $F_{B.1}$, $F_{B.1}$, etc. stored in constituent graph B. A user-centric fact includes a subject graph node 306, an object graph node 308, and an edge 310 connecting the subject graph node to the object graph node.

Subject graph nodes and object graph nodes may be generically referred to as nodes. Nodes may represent any noun, where "noun" is used to refer to any entity, event, or concept, or any suitable application-specific information (e.g., details of a previous action performed by the user using the computer service). Similarly, "subject noun" and "object noun" are used herein to refer to nouns which are represented by a subject graph node or by an object graph node respectively. Representing the collection of user-centric facts as a graph data structure may facilitate manipulating and traversing the graph data structure (e.g., to respond to a query).

It is instructive to visualize the collection of user-centric facts in a graphical format as shown in graph data structure 300. Nodes 352 are depicted as filled circles and edges 354 are depicted as arrows. Filled circles with an outgoing edge (where the arrow points away from the filled circle) depict subject graph nodes, while filled circles with an incoming edge (where the arrow points towards the filled circle) depict object graph nodes. The multiple constituent graphs may be treated as a single graph by regarding edges between constituent graphs as edges in the larger graph. Accordingly, FIG. 3B shows a single combined graph 300 including a plurality of constituent graph structures. To simplify explanation, example graph 300 only includes two constituent graphs, with twelve nodes in total. In actual implementations, a user centric graph will include many more nodes (e.g., hundreds, thousands, millions, or more) spread between many more constituent graphs.

An exemplary user-centric fact $F_{A.1}$ of constituent graph structure includes subject graph node $S_{A.1}$, edge $E_{A.1}$, and object graph node $O_{A.1}$. For example, subject graph node $S_{A.1}$ may represent the user's employer and object graph node $O_{A.1}$ may represent a task assigned to the user by her employer. The edge $E_{A.1}$ may describe any suitable relationship between subject graph node $S_{A.1}$ and object graph node $O_{A.1}$. In the above example, edge $E_{A.1}$ may represent an "assigned new task" relationship. The subject-edge-object triple of user-centric fact $F_{A.1}$ collectively represents the fact that the user's employer assigned her a new task.

A subject graph node of a first fact may represent the same noun as an object graph node of a second, different fact. Accordingly, said subject graph node and object graph node may be represented as a single node, e.g., a node 322 with an incoming arrow and an outgoing arrow as depicted in FIG. 3B. By recognizing that certain object graph nodes and subject graph nodes represent the same noun, the graph data structure may be able to represent user-centric facts as complex relationships among a plurality of different nouns, which may be visualized as paths on graph 300'. For example, when a particular node is the object graph node of a first fact and the subject graph node of a second, different fact, it may be possible to derive inferences from the combination of the two facts, analogous to a logical syllogism.

A subject graph node of a first user-centric fact may represent the same noun as a subject graph node of a second, different user-centric fact. When two different subject graph nodes represent the same noun, the graph data structure may recognize the two subject graph nodes as a single node, e.g., a node 324 with two outgoing arrows in FIG. 3B. Although the two subject graph nodes may be represented as a single node, each outgoing edge of the node is distinct from each other outgoing edge. These outgoing edges may point to the same object node or to different object nodes. In either case, the subject node may be involved in two different user-centric facts.

Similarly, an object graph node of a first user-centric fact may represent the same noun as an object graph node of a second, different user-centric fact. In other words, the same noun may be the object of a plurality of different user-centric facts, having different subject graph nodes and possibly having edges representing different relationship types, e.g., as with node 326 with two incoming arrows in FIG. 3B. Accordingly, the graph data structure may recognize the two object graph nodes as a single node, which is depicted in the same position in the graph 300.

A particular pairing of a subject noun and an object noun may be involved in two or more different user-centric facts. For example, the subject noun and object noun may be represented by the pair of nodes indicated at 328, which are connected by two distinct edges, e.g., representing distinct relationships between the subject and object graph nodes. In an example, the subject graph node corresponds to a user account (e.g., identified by an email address). In the same example, the object graph node may correspond to a second, different user account. In the example, a first edge may represent a "sent email to" relationship, while a second edge represents a different "scheduled meeting with" relationship. Accordingly, the graph data structure includes two or more user-centric facts having the same subject and object nouns.

In other examples, two nouns may be involved in two different user-centric facts, but with the role between subject and object swapped. In other words, a first noun is a subject noun of a first fact and a second noun is an object noun of the first fact, while the first noun is an object noun of a second fact and the second noun is a subject noun of the second fact. For example, a pair of nouns representing "Alice" and "Bob" might be involved in a first fact saying that "Alice scheduled a meeting with Bob" while also being involved in a second fact saying that "Bob scheduled a meeting with Alice." In addition to swapping a role of subject and object, the two facts using the two nouns may have different types of edges, e.g., "Alice" and "Bob" might additionally be involved in a third fact saying that "Bob sent an email to Alice." More generally, nouns may be connected via edges to represent relationships in any suitable fashion, e.g., with any number of edges between two nodes, going between the first and second node in any combination of forward and/or backward direction.

In still further examples, the graph data structure may recognize a noun from one constituent graph and a noun from a different constituent graph as a single node. Such recognition that two or more different nodes correspond to the same noun may be referred to herein as a "node cross-reference" between the two nodes. A subject graph node or object graph node representing a particular noun may store node cross-references to other nodes of the same constituent graph structure or any other constituent graph structure.

Similarly, a user-centric fact in a first constituent graph structure may define a subject graph node in the first constituent graph structure, along with an edge pointing to an object graph node in a second, different constituent graph structure (herein referred to as an "cross-reference edge"). The user-centric graph may represent the connection between the constituent graphs in any suitable manner, for example, by storing a constituent graph identifier in constituent graph A, the identifier indicating a connection to an object graph node in constituent graph B, and an object graph node identifier indicating the particular object graph node in constituent graph B.

Node cross-references and cross-reference edges connect the plurality of constituent graph structures. For example, node cross-references and cross-reference edges may be traversed in the same way as edges, allowing a traversal of the graph data structure to traverse a path spanning across multiple constituent graph structures. In other words, graph data structure 300 and/or data format 300' facilitate a holistic artificial intelligence knowledge base that includes facts from different computer services and/or facts spanning across different computer services. Node cross-references and cross-reference edges may be collectively referred to herein as cross-references. Similarly, when a node is involved in cross-references within a plurality of constituent graph structures, the node may be referred to as cross-referenced across the constituent graph structures.

Furthermore, in addition to connecting two different constituent graph structures via cross-references, a constituent graph structure may include one or more user-centric facts involving a subject graph node in the constituent graph structure and an object graph node in an external knowledge base (e.g., based on the Internet, a social network, or a networked, enterprise computer service). As with cross-reference edges, an outgoing edge connected to the subject graph node may indicate a connection to an external object graph node in any suitable manner, e.g., by storing a pair of identifiers indicating the external graph and the object graph node within the external graph. In some cases, the external graph may not store any user-centric data, e.g., when the external graph is a global knowledge base derived from published knowledge on the Internet.

By including cross-references between constituent graph structures, facts about a particular noun (e.g., event or entity) may be distributed across the plurality of constituent graph structures, while still supporting centralized reasoning about the relationship between user-centric facts in different constituent graph structures and in external databases (e.g., by traversing the plurality of constituent graph structures via the cross-references and cross-reference edges).

Each user-centric fact may be stored in a predictable, shared data format, which stores user-centric facts including application-specific facts associated with a computer service without requiring a change to the format of application-specific data the computer service. Such a predictable, shared data format is herein referred to as an "application-agnostic data format." The application-agnostic data format may store information needed to query the user-centric graph, while avoiding the redundant storage of application-specific data. The graph data structure may be implemented with a complementary application programming interface (API) allowing read and write access to the graph data structure. The API may constrain access to the graph data structure so as to ensure that all data written to the graph data structure is in the application-agnostic data format. At the same time, the API may provide a mechanism that any computer service may use to add new user-centric facts to the graph data structure in the application-agnostic data format, thereby ensuring that all data stored within the graph data structure is predictably useable by other computer services using the API. In addition to providing read/write access to user-centric facts stored in the graph data structure, the API may provide data processing operations that include both reads and writes, e.g., query operations and caching of query results.

A graph data structure including user-centric facts related to a plurality of different computer services, such as graph data structure 300, may be variously implemented without departing from the spirit of this disclosure. For example, the graph data structure may be stored as a collection of node records, each of which optionally indicates one or more outgoing edges to other nodes. Alternately or additionally, the graph data structure may be stored as a pointer-based data structure, list data structure, matrix data structure, or as any other suitable representation of graphical data.

In an example, a user-centric fact stored in the graph data structure is an application-specific fact. In addition to the application-specific fact, the user-centric fact may include one or more enrichments, where an enrichment is an additional datum that includes an application-agnostic fact associated with the application-specific fact. For example, an enrichment may include a browser-specific enrichment based on details of user interaction with a browser program (e.g., browser 110). The browser specific enrichment may include information describing a single interaction between the user and the browser, a whole session of user/browser interactions, and/or any suitable set of historical user/browser interactions. In the example shown in FIG. 1A, a browser-specific enrichment may include a computer-readable description of the user's visit to a travel booking page. Alternately or additionally, the browser-specific enrichment may include an analysis of further interactions between the user and the browser. For example, the enrichment may include a description that the user frequently visited the travel booking page within the last week, along with a description of the frequency and specific times the user visited the travel booking page. Triggering facts, user-centric facts defining contexts, and other user-centric facts in the user-centric graph may include any suitable browser-specific or other application-specific enrichments. Accordingly, assistive information presented by the browser may be based on such enrichments.

The application-agnostic data format for user-centric facts permits efficient storage of application-specific facts, in addition to the application-agnostic representation of the connections in the graph data structure. For example, a subject graph node may represent a subject of an application-specific fact, e.g., the fact that a new meeting was scheduled. Accordingly, the graph data structure may store for the application-specific fact a facet pointer that indicates auxiliary application-specific data associated with the application-specific fact. In an example, auxiliary application-specific data is indicated in the form of a facet pointer. A facet point is an identifier (e.g., a numeric identifier) indicating a storage location of the auxiliary application-specific data associated with the user-centric graph, e.g., a storage location of a calendar entry representing details of the meeting. A facet pointer may be associated with a particular type of data based on its inclusion in an application-specific graph structure, e.g., constituent graph structure A may be associated with schedule planning software and may accordingly include calendar data as opposed to other types of application-specific data. In other examples, a facet pointer may include additional identifying information specifying a type of the auxiliary application-specific data, so that facet pointers may be used to represent different kinds of auxiliary application-specific data (e.g., multiple file types useable by a word processing application). The graph data structure may be used to find auxiliary application-specific data via the facet pointers, while avoiding redundantly storing the auxiliary application-specific data within the graph data structure.

In addition to the facet pointer stored in a subject graph node, an application-specific fact is further represented by the edges connecting the subject graph node to one or more object graph nodes. Although a single subject graph node may be included in more than one user-centric fact, the graph data structure nevertheless efficiently stores only a single node record for the subject graph node. This node record includes the list of all of the node's outgoing edges, which may reduce a storage space requirement compared to storing a copy of the subject graph node for each user-centric fact in which it occurs. The list of outgoing edges may be empty for some nodes, e.g., for a noun that is only an object graph node. The list of outgoing edges of a subject graph node includes one or more edge records defining one or more edges. A graph node may have any number of outgoing edges, to suitably represent relationships to other nodes of the graph data structure, e.g., zero, one, or three or more edges.

In addition to representing an application-specific fact via the facet pointer and the list of outgoing edges, a subject graph node may represent the one or more enrichments of the application-specific fact. In an example, the one or more enrichments include a node confidence value, which may indicate a relevance of a graph node to the user. For example, the confidence value may be determined by a machine learning model trained to recognize relevance to the user, by learning to distinguish labelled samples of relevant data from labelled samples of irrelevant data. For example, training the machine learning model may include supervised training with user-labelled samples (e.g., derived from direct user feedback during application with an application), and/or unsupervised training. The one or more enrichments may further include an edge confidence value associated with each edge. As with node confidence values, an edge confidence value may indicate a relevance of a particular edge to the user. Different edges between a pair of nodes may have different confidence values. For example, an edge indicating a "scheduled meeting" relationship may have a lower edge confidence than a different edge indicating a "made commitment," e.g., if the scheduled meeting is believed to be more relevant to the user than the commitment.

In addition to a node confidence value and edge confidence value, the one or more enrichments of the application-specific fact may include other application-agnostic and/or application-specific data. For example, a node may include access metadata indicating information associated with accessing the node in the user-centric graph, and associated application-specific data (e.g., data indicated by a facet pointer). Access metadata may include a timestamp indicating a time and date of a most recent access, a delta value indicating a change caused by a most recent access, or any other suitable metadata.

The graph data structure may additionally store, for a user-centric fact, one or more tags defining auxiliary data associated with the user-centric fact, including any suitable auxiliary data associated with a node/edge. For example, when a graph node represents a person (e.g., associated with a contact book entry), the tags may include a nickname of the person and an alternate email address of the person.

User-centric facts and nodes/edges of the user-centric facts may be enriched with additional semantics stored in the tags. For example, tags may be used to store one or more enrichments of a user-centric fact. A tag stored within a node record may be associated with a user-centric fact in which the node record represents a subject graph node or in which the node record represents an object graph node. Alternately or additionally, a tag stored within a node record may be associated with the node record itself (e.g., associated with a subject graph node represented by the node record and/or with an object graph node represented by the node record), or with one or more edges connected to the node record. In other examples, tags may be used to store metadata of a user-centric fact (e.g., instead of or in addition to the access metadata of the user-centric fact). For example, when a user-centric fact is associated with a timestamp, the timestamp may optionally be stored among the tags of the user-centric fact.

In some examples, the one or more tags are searchable tags and the graph data structure is configured to allow searching for a user-centric fact by searching among the searchable tags (e.g., searching for a tag storing a search string, or searching for a tag storing a particular type of data).

Graph data structures may be represented as a plurality of application-specific constituent graph structures, wherein nodes of the constituent graph structures are cross-referenced across constituent graph structures (e.g., by cross-reference edges and node cross-references, as described above).

The user-centric graph is application-agnostic, in that it may be used to track facts from two or more potentially unrelated computer services, which may have different native data formats. The user-centric graph may store application-specific facts of any computer service by storing a facet pointer, enabling user-centric facts to include application-specific facts even when the application-specific facts may be stored in an application-specific format. Moreover, the user-centric graph enables the representation of user-centric facts that are defined in a context of two or more computer services, by storing cross-references in the form of domain identifiers (e.g., object domain identifiers in lists of outgoing edges of each subject graph node, or reference domain identifiers in a representation of a node cross-reference) and node identifiers (e.g., object graph node identifiers and reference node identifiers). Furthermore, the user-centric graph is user-centric, as a different user-centric graph may be defined for each user. The user-centric graph may be suitable to store user-centric facts in contexts where each of a plurality of different users interact with a shared computer service (e.g., a web browser). Because the user-centric graph stores application-specific facts via the facet pointer and represents relationships to facts in other data structures via cross-references, it may be able to store user-centric facts concerning a user in a user-centric graph data structure particular to the user, without requiring write access to application-specific data of the shared computer service.

When adding a new user-centric fact based on an application-specific fact, the graph data structure optionally may store an application-agnostic enrichment, e.g., an application-agnostic fact associated with the application-specific fact. A user-centric fact may be partially defined by an enrichment received from the application-specific data provider. Alternately or additionally, the user-centric fact as provided by the application-specific data provider may be preprocessed to include one or more enrichments via an enrichment pipeline including one or more enrichment adapters. When the graph data structure stores tags associated with a user-centric fact (e.g., tags stored in a node record), the one or more enrichments may be included among the tags.

In an example, an enrichment adapter includes a machine learning model configured to receive an application-specific fact, to recognize a relevance of the application-specific fact to a user, and to output a confidence value numerically indicating the relevance. The machine learning model may be any suitable model, e.g., a statistical model or a neural network. The machine learning model may be trained, e.g., based on user feedback. For example, when the machine learning model is a neural network, output of the neural network may be assessed via an objective function indicating a level of error of a predicted relevance output by the neural network, as compared to an actual relevance indicated in user feedback. The gradient of the objective function may be computed in terms of the derivative of each function in layers of the neural network using backpropagation. Accordingly, weights of the neural network may be adjusted based on the gradient (e.g., via gradient descent) to minimize a level of error indicated by the objective function. In some examples, a machine learning model may be trained for a particular user based on direct feedback provided by the user while interacting with a computer service, e.g., indicating relevance of search results in a search application. Accordingly, the trained machine learning model may be able to estimate relevance to the user. In some examples, the machine learning model may be trained based on indirect feedback from the user, e.g., by estimating a similarity of relevant content to other content that the user indicated to be relevant in the past.

In another example, an enrichment adapter includes a natural language program for recognizing natural language features of an application-specific fact. For example, the natural language program may determine a subject graph node and/or object graph node for the application-specific fact, by recognizing a natural language feature as being associated with an existing subject and/or object graph node. In some examples, the natural language program may determine a relationship type for an edge for the application-specific fact. In some examples, the natural language program may determine one or more tags of a subject graph node and/or object graph node for the application-specific fact. The natural language program may be configured to recognize features including: 1) named entities (e.g., people, organizations, and/or objects), 2) intents (e.g., a sentiment or goal associated with a natural language feature), 3) events and tasks (e.g., a task the user intends to do at a later time), 4) topics (e.g., a topic that a user-centric fact contains or represents), 5) locations (e.g., a geographic location referred to by a user-centric fact, or a place where a user-centric fact was generated), and/or 6) dates and times (e.g., a timestamp indicating a past event or a future scheduled event associated with a user-centric fact).

The enrichments associated with user-centric facts may provide enriched semantics of the user-centric facts (e.g., additional meaningful information, beyond information provided by the connection structure formed by an edge between a subject graph node and object graph node of the user-centric fact). The graph data structure may recognize and include additional user-centric facts that may be derived from the enriched semantics (e.g., based on one or more enrichments added in the enrichment pipeline). Accordingly, adding a user-centric fact including one or more enrichments may further include recognizing an additional user-centric fact based on the one or more enrichments, and adding the additional user-centric fact to the graph data structure in the application-agnostic data format.

Recognizing the additional user-centric fact based on the one or more enrichments may include recognizing that an enrichment of the one or more enrichments corresponds to another user-centric fact already included in the graph data structure (e.g., because the enrichment is associated with a subject noun or object noun of the other user-centric fact). Alternately or additionally, recognizing the additional user-centric fact based on the one or more enrichments may include recognizing a first enrichment of the one or more enrichments that is associated with a subject noun not yet involved in any user-centric facts, recognizing that a second enrichment of the one or more enrichments is associated with an object noun, recognizing a relationship between the subject noun and the object noun, and adding a new user-centric fact involving the object noun and subject noun to the graph data structure. In some examples, recognizing the additional user-centric fact based on the one or more enrichments includes recognizing any suitable relationship among the one or more enrichments, and adding a user-centric fact representing the recognized relationship.

In an example, a first node and a second node each include an enrichment specifying a recognized named entity, wherein both enrichments specify the same named entity. Accordingly, the graph data structure may store an edge connecting the first node to the second node, and the relationship type of the edge may indicate that the two nodes were inferred to be associated with the same entity. Alternately or additionally, the graph data structure may store a node cross-reference in each node, indicating that the other node is associated with the same named entity. Alternately, the graph data structure may modify the first node to include data of the second node and delete the second node, thereby avoiding the redundant storage of data of the second node by collapsing the representation to include a single node instead of two nodes.

In another example, a first node includes an enrichment specifying a named entity, and an edge may be added connecting the first node to a second node that represents the same named entity. In another example, an edge may be added between a first node and a second node that have the same associated topic. In another example, an edge may be added between a first node and a second node that have the same associated time and/or location. For example, an edge may be added between a first node that refers to a specific calendar date (e.g., in a tag) and a second node that was created on the specific calendar date (e.g., as indicated by access metadata). In another example, an edge may be added between two nodes that were created at the same location or that refer to the same location.

There is no limit to the number of different computer services that may contribute to the knowledge base. Additionally, there is no requirement that the different computer services be related to each other or to the user-centric graph in any particular way (e.g., the different computer services and the user-centric graph may be mutually unrelated and provided by different computer service providers). Accordingly, the user-centric knowledge AI base may include user-centric facts derived from a plurality of different computer services, thereby including more user-centric facts from more different contexts. Furthermore, the cross-references between application-specific constituent graph structures enable user-centric facts to express relationships between aspects of the different computer services, which may further improve utility compared to maintaining a plurality of different, separate knowledge bases without cross-references.

The graph data structure represents structured relationships between the user-centric facts (e.g., two facts having the same subject noun may be represented by a single node record within a constituent graph and cross-referenced between constituent graphs). As such, it may be more efficient to traverse the graph data structure to find user-centric facts satisfying the query, than it would be to exhaustively search the collection of user-centric facts. For example, if a user has frequently interacted with a particular other person, the frequent interaction may indicate that the other person is likely relevant to the user. Accordingly, there may be more user-centric facts having that person as subject or object, and while traversing edges of the graph data structure, encountering a node representing the other person may be more likely because of the many edges leading to and from the node representing the other person.

Traversing the graph data structure may include a "random walk" along edges of the graph data structure. The random walk may start at a current user context, used herein to refer to any suitable start point for answering a query. In examples, a current user context may be defined by the query (e.g., by including a context keyword indicating a subject graph node to use as the start point). In other examples, a current user context may be an application-specific context (e.g., "answering email") suitable to determine a subject graph node to use as the start point.

When encountering a node during the random walk (e.g., at the start point), the node may be examined to determine if it satisfies the constraints of the query. If it does, it may be output in the subset of user-centric facts responsive to the query. Then, after encountering the node, the random walk may continue, so that more nodes are encountered. To find more nodes, the random walk may continue along outgoing edges of the encountered node. Determining whether to continue along an outgoing edge may be a weighted random determination, including assessing a weight representing a likelihood of following the edge and sampling whether to follow the edge based on the weight and random data, e.g., a "roulette wheel selection" algorithm implemented using a random number generator. The weight of an edge connecting a subject graph node to an object graph node may be determined based on the confidence value of the subject graph node, the edge, and/or the object graph node. In an example, the confidence values may be interpreted as indications of relevance to the user, so that edges which are more relevant or which connect more relevant nodes are more likely to be followed. The weight of the edge may be further determined based on other data of the subject graph node, object graph node, and edge, e.g., by assessing a relevance of an edge to the query based on a natural language comparison of the edge type to one or more natural language features of the query.

By specifying constraints (e.g., features of the subject graph node, object graph node, and edge defining a user-centric fact), a user may be able to formulate a variety of queries to be answered using the user-centric graph.

In addition to selecting a subset of user-centric facts satisfying constraints specified in a query, the user-centric graph may enable responding to other specialized queries, e.g., slice queries and rank queries.

In an example, a query is a slice query indicating a start node and a distance parameter. The answer to a slice query is a subset of user-centric facts including user-centric facts reached by starting at the start node and traversing edges of the graph data structure to form paths of length equal to at most the distance parameter away from the start node. For example, if the distance parameter is set to 1, the answer to the query will include the start node and all once-removed nodes directly connected to the start node; and if the distance parameter is set to 2, the answer to the query will include the start node, all once-removed nodes, and all twice-removed nodes directly connected to at least one of the once-removed nodes. A slice query may represent a collection of user-centric facts which are potentially relevant to a particular user-centric fact of interest (e.g., a user-centric fact involving the start node), by way of being connected to the start node by a path of at most the distance parameter. By setting a small distance parameter, the answer to the query may represent a relatively small collection of facts that are closely related to the start node; similarly, by setting a large distance parameter, the answer may represent a large collection of facts that are indirectly related to the start node. As an alternative to specifying a start node, a query may also use a current user context as the start node, thereby representing a collection of user-centric facts related to the user's current context.

In another example, a query is a rank query to rank the plurality of user-centric facts based at least on a confidence value associated with each user-centric fact, and the subset of user-centric facts is ranked in order according to the confidence value of each user-centric fact. A rank query may be interpreted as gathering user-centric facts which are likely to be relevant to the user, without imposing additional specific constraints on the query. In addition to ranking the plurality of user-centric facts based on a confidence value, the plurality of user-centric facts may be ranked based on other features. For example, user-centric facts may be weighted as more relevant if they are more recent (e.g., according to a timestamp associated with each fact). In another example, a rank query may include a keyword and user-centric facts may be weighted as more relevant if they include at least one node having the keyword among its tags.

Although two examples of specialized queries ("slice" and "rank") are described above, a user-centric graph enables other kinds of specialized query based on "slice" queries, "rank" queries, and other traversals of the user-centric graph according to any suitable constraints. For example, the subset of user-centric facts responsive to a slice query may additionally be ranked by confidence value as in a rank query, thereby combining functionality of the two kinds of query. In another example, a query is a pivot query indicating a start node. The answer to a pivot query is a subset of user-centric facts including user-centric facts reached by starting at the start node and traversing edges of the graph data structure to form paths of an unbounded (or arbitrary, large) length. A pivot query may be interpreted as a slice query that does not bound the length of paths reached by the start node, e.g., where the distance parameter is infinite. In some examples, an answer to a query may include a visualization of the answer subset of user-centric facts as a graph diagram, which may be annotated or animated to include any suitable information of the user-centric facts (e.g., auxiliary application-specific data indicated by a facet pointer of a node included in one of the user-centric facts).

A query may define a time constraint, so that a subset of user-centric facts output in response to the query is restricted to user-centric facts associated with timestamps indicating times within a range defined by the query. In some examples, time is an inherent property of nodes and edges in the graph data structure (e.g., each user-centric fact of the plurality of user-centric facts included in the graph data structure is associated with one or more timestamps). The one or more timestamps associated with a node or edge may indicate a time when a user-centric fact was created, accessed, and/or modified (e.g., access metadata of a node defining the user-centric fact). Alternately or additionally, the one or more timestamps may indicate a time referred to in a user-centric fact (e.g., a time at which a meeting is scheduled, or any other timestamp added by an enrichment adapter in the enrichment pipeline). The one or more timestamps may optionally be stored as searchable tags.

In some examples, the one or more constraints defined by a query include an answer type constraint, and accordingly, the subset of user-centric facts selected responsive to the query may include only user-centric facts that satisfy the answer type constraint. For example, an answer type constraint may constrain a feature of a subject graph node, object graph node, and/or edge of the user-centric fact. For example, an answer type constraint may indicate a particular type of subject and/or object graph node, such as: 1) either subject or object is a person; 2) both subject and object are coworkers; 3) subject is a place; 4) object is a topic; or 5) subject is a person and object is a scheduled event. Alternately or additionally, the answer type constraint may indicate one or more particular subjects and/or objects, such as 1) subject is the user; 2) subject is the user's boss, Alice; or 3) object is any of Alice, Bob, or Charlie. Alternately or additionally, the answer type constraint may indicate one or more particular types of edge, e.g., by indicating a type of relationship such as a "sent email" relationship, a "went to lunch together" relationship, or a "researched topic" relationship.

In some examples, the one or more constraints defined by the query may include a graph context constraint, and accordingly, the subset of user-centric facts selected responsive to the query may include only user-centric facts that are related to a contextualizing user-centric fact in the user-centric graph that satisfies the graph context constraint. Two different user-centric facts may be described herein as related based on any suitable features of the graph data structure that may indicate a possible relationship. For example, when a graph context constraint indicates the user's boss, Alice, the contextualizing user-centric fact may be any fact having a node representing Alice as a subject graph node or as an object graph node. Accordingly, the subset of user-centric facts selected responsive to the query may include other user-centric facts having subject and/or object graph nodes that are directly connected, via an edge, to the node representing Alice. Alternately or additionally, the subset of user-centric facts may include user-centric facts that are indirectly related to Alice, e.g., a user centric fact having a subject and/or object graph node that is indirectly connected, via a path of two or more edges, to the node representing Alice. In some cases, a query including a graph context constraint may be a slice query, and the subset of user-centric facts may include only user-centric facts that are related to the contextualizing user-centric fact and reachable within at most a particular distance of a node of the contextualizing user-centric fact. In other examples, a query including a graph context constraint may be a rank query, and the subset of user-centric facts may include a selection of user-centric facts that are most likely to be relevant to the contextualizing user-centric fact, e.g., user-centric facts that are connected to the contextualizing user-centric fact via many different paths, or via a path including edges having high confidence values.

Answering a query may include traversing the graph data structure based on the one or more timestamps associated with each user-centric fact, which may be referred to herein as traversal of a time dimension of the graph data structure. For example, answering a query may include starting at a node associated with a time defined by the query, and traversing the graph by following any edge with a timestamp indicating a later time, so that the timestamps increase in the same order as the traversal. In other examples, answering a query may include traversing the graph data structure by following any edge with a timestamp preceding a date defined by the query. Furthermore, the inherent time property of each node and edge in the graph data structure may enable a timeline view of the graph data structure. In examples, an answer to a query may include a timeline view of the graph data structure, e.g., user-centric facts arranged in chronological order by a timestamp associated with each user-centric fact.

As another example of a specialized query, the graph data structure may be configured to allow searching for a user-centric fact based on a searchable tag stored by the graph data structure for the user-centric fact. Searching for a user-centric fact based on a searchable tag may include traversing the graph in any suitable manner (e.g., as described above with regards to slice queries or pivot queries), and while traversing the graph, outputting any user-centric facts encountered during the traversal for which the graph structure stores the searchable tag.

As another example of a specialized query, the graph data structure may be configured to serve a user context query, by searching for user-centric facts that may be relevant to a current context of a user. Accordingly, the user context query may include one or more constraints related to the current context of the user. For example, the one or more constraints may include a time constraint based on a current time at which the user context query is served. Alternately or additionally, the one or more constraints may include a graph context constraint related to the current context of the user, e.g., a graph context constraint specifying a task in which the user may be engaged.

In some examples, the one or more constraints of the user context query may be based on state data of a computer service that issued the user context query. In some examples, the state data of the computer service includes a natural language feature (e.g., an intent, entity, or topic), and the one or more constraints include an indication of the natural language feature. For example, when the computer service is an email program, the one or more constraints of a user context query may include: 1) a time constraint based on a time at which a user begins composing an email; 2) a graph context constraint indicating a topic of a subject of the email; and 3) a graph context constraint indicating a recipient of the email. Accordingly, a subset of user-centric facts selected responsive to the user context query may include user-centric facts which are current (based on the timestamp) and which are likely to be related to the user's task of composing the email (based on the topic and recipient).

Exemplary Computing System

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 4:
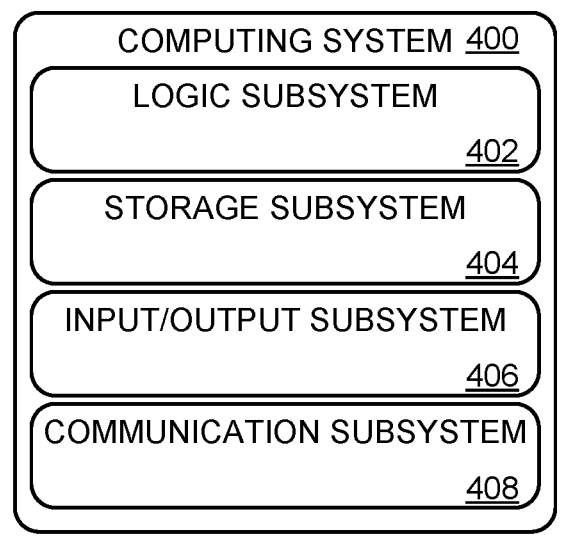
FIG. 4 shows an exemplary computer system.

FIG. 4 schematically shows a simplified representation of a computing system 400 configured to provide any to all of the compute functionality described herein. Computing system 400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 400 may include any combination of logic subsystems, storage subsystems, and/or other subsystems of one or more of user-centric graph server 103, client computer 102, user-centric data sources 105A-105N, network 104, and/or other computers not shown in FIG. 1A.

Computing system 400 includes a logic subsystem 402 and a storage subsystem 404. Computing system 400 may optionally include an input/output subsystem 406 (e.g., comprising one or more input devices or sensors, and one or more output devices such as a graphical display and/or audio speakers), communication subsystem 408, and/or other subsystems not shown in FIG. 4.

Logic subsystem 402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 404 includes one or more physical devices configured to temporarily and/or permanently hold computer information such as data and instructions executable by the logic subsystem. When the storage subsystem includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to hardware and any software, instructions, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., computer service) cooperating with a remote component (e.g., cloud computing service). The software and/or other instructions that give a particular machine its functionality may optionally be saved as an unexecuted module on a suitable storage device. Non-limiting examples of machines which may be instantiated by computing system 400 according to the present disclosure include browser 110 and user-centric graph 300, as well as any computer services which may be configured to interact with browser 110 and user-centric graph 300, e.g., an email client, a scheduling program, etc.

Machines according to the present disclosure may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, performance is improved with regard to the user experience of the users and/or populations of users.

For example, a dialogue system according to the present disclosure may be trained to interact with different populations of users, using language models that are trained to work well for those populations based on language, dialect, accent, and/or any other features of speaking style of the population.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components can and should be designed to provide context as to how they operate as much as is possible, so that implementers of ML and/or AI systems can be accountable for decisions/assessments made by the systems. For example, ML and/or AI systems should have replicable behavior, e.g., when they make pseudo-random decisions, random seeds should be used and recorded to enable replicating the decisions later. As another example, data used for training and/or testing ML and/or AI systems should be curated and maintained to facilitate future investigation of the behavior of the ML and/or AI systems with regard to the data. Furthermore, ML and/or AI systems can and should be continually monitored to identify potential bias, errors, and/or unintended outcomes.

When included, input/output subsystem 406 may be used to present a visual representation of data held by storage subsystem 404. This visual representation may take the form of a graphical user interface (GUI). Input/output subsystem 406 may include one or more display devices utilizing virtually any type of technology. In some implementations, display subsystem may include one or more virtual-, augmented-, or mixed reality displays.

When included, input/output subsystem may further comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 408 may be configured to communicatively couple computing system 400 with one or more other computing devices. Communication subsystem 408 may include wired and/or wireless communication devices compatible with one or more different communication protocols. The communication subsystem may be configured for communication via personal-, local- and/or wide-area networks.

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be preprocessed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

In an example, a method for providing contextual information to a user during a browsing session, comprises: maintaining a user-centric graph including a plurality of user-centric facts associated with the user and derived from interaction by the user with a plurality of different computer services; recognizing a context of interaction with a browser application by a user, the context defined by at least one or more contextualizing user-centric facts in the user-centric graph; evaluating the context to identify assistive information pertaining to the context; and displaying the assistive information to the user. In this or any other example, the assistive information is based at least on one or more user-centric facts derived from interaction by the user with a plurality of different computer services. In this or any other example, the method further comprises recognizing a triggering fact in order to trigger recognition of the context; and adding the triggering fact to the user-centric graph, wherein identifying the assistive information is based at least on a relationship in the user-centric graph between the triggering fact and one or more other user-centric facts in the user-centric graph. In this or any other example, the triggering fact includes one or more previous interactions, by the user, with the browser. In this or any other example, the triggering fact includes a previous interaction, by the user, with a computer service other than the browser. In this or any other example, the relationship in the user-centric graph between the triggering fact and the one or more other user-centric facts in the user-centric graph is a temporal relationship. In this or any other example, recognizing the triggering fact includes assessing, for a candidate fact, a signal strength score indicating a strength of relationship between the candidate fact and user-centric facts in the user-centric graph, and recognizing the triggering fact responsive to the signal strength score exceeding a threshold.

In an example, a for providing contextual information to a user during a browsing session, comprises: maintaining a user-centric graph including a plurality of user-centric facts associated with the user and derived from interaction by the user with a plurality of different computer services; recognizing a context of interaction with a browser application by a user; identifying assistive information pertaining to the context, the assistive information being based at least on one or more user-centric facts in the user-centric graph; and displaying the assistive information to the user. In this or any other example, the context is defined by at least one or more contextualizing user-centric facts derived from interaction by the user with a plurality of different computer services. In this or any other example, the method further comprises recognizing a triggering fact in order to trigger recognition of the context, wherein identifying the assistive information is based at least on a relationship in the user-centric graph between the triggering fact and one or more other user-centric facts in the user-centric graph. In this or any other example, the triggering fact includes one or more previous interactions, by the user, with the browser. In this or any other example, the triggering fact includes a previous interaction, by the user, with a computer service other than the browser. In this or any other example, the relationship in the user-centric graph between the triggering fact and the one or more other user-centric facts in the user-centric graph is a temporal relationship. In this or any other example, the triggering fact includes assessing, for a candidate fact, a signal strength score indicating a strength of relationship between the candidate fact and user-centric facts in the user-centric graph, and recognizing the triggering fact responsive to the signal strength score exceeding a threshold.

In an example, a system for providing contextual information to a user during a browsing session, comprises: a logic device; and a storage device configured to hold: a user-centric graph including a plurality of user-centric facts associated with the user and derived from interaction by the user with a plurality of different computer services; and instructions executable by the logic device to: recognize a triggering fact in order to recognize a context of interaction with a browser application by a user; and identify assistive information pertaining to the context, the assistive information being based on the context and at least on one or more user-centric facts in the user-centric graph. In this or any other example, the instructions are further executable to receive, from the browser, a computer-readable description of one or more previous interactions, by the user, with the browser, and wherein the triggering fact includes the computer-readable description of the one or more previous interactions. In this or any other example, the triggering fact includes a description of a previous interaction, by the user, with a computer service other than the browser. In this or any other example, the relationship in the user-centric graph between the triggering fact and the one or more other user-centric facts in the user-centric graph is a temporal relationship. In this or any other example, recognizing the triggering fact includes assessing, for a candidate fact, a signal strength score indicating a strength of relationship between the candidate fact and user-centric facts in the user-centric graph, and recognizing the triggering fact responsive to the signal strength score exceeding a threshold. In this or any other example, the assistive information includes information based on one or more of 1) emails to or from the user, 2) contacts of the user, 3) calendar data of the user, 4) documents, 5) web pages, 6) location data associated with the user, and/or 7) application usage data associated with the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for providing contextual information to a user during a browsing session, comprising:
maintaining a user-information graph including a plurality of facts associated with the user and derived from interaction by the user with a plurality of different computer services, wherein the user-information graph includes application-specific constituent graph structures associated with the plurality of different computer services, each application-specific constituent graph structure including edges connecting it to one or more other of the application-specific constituent graph structures, each application-specific constituent graph structure including a plurality of nodes;
recognizing, based on a relationship between the application-specific constituent graph structures, a context of interaction with a browser application by a user;
evaluating the context to identify information pertaining to the context, the information including a natural language description; and
displaying the information to the user.

2. The method of claim 1, wherein the information is based at least on one or more facts derived from interaction by the user with the plurality of different computer services.

3. The method of claim 1, further comprising:
recognizing a triggering fact in order to trigger recognition of the context; and
adding the triggering fact to the user information graph, wherein identifying the information is based at least on a relationship in the user information graph between the triggering fact and one or more other facts in the user information graph.

4. The method of claim 3, wherein the triggering fact includes one or more previous interactions, by the user, with the browser application.

5. The method of claim 3, wherein the triggering fact includes a previous interaction, by the user, with a computer service other than the browser application.

6. The method of claim 3, wherein the relationship in the user-information graph between the triggering fact and the one or more other facts in the user information graph is a temporal relationship.

7. The method of claim 3, wherein recognizing the triggering fact includes assessing, for a candidate fact, a signal strength score indicating a strength of relationship between the candidate fact and facts in the user-information graph, and recognizing the triggering fact responsive to the signal strength score exceeding a threshold.

8. A method for providing contextual information to a user during a browsing session, comprising:
maintaining a user-information graph including a plurality of facts associated with the user and derived from interaction by the user with a plurality of different computer services, wherein the user-information graph includes application-specific constituent graph structures associated with the plurality of different computer services, each application-specific constituent graph structure including edges connecting it to one or more of the application-specific constituent graph structures, each application-specific constituent graph structure including a plurality of nodes;
recognizing, based on a relationship between the application-specific constituent graph structures, a context of interaction with a browser application by a user;
identifying information pertaining to the context, the information being based at least on one or more facts in the user-information graph and including a natural language description; and
displaying the information to the user.

9. The method of claim 8, wherein the context is defined by at least one or more contextualizing facts derived from interaction by the user with the plurality of different computer services.

10. The method of claim 8, further comprising recognizing a triggering fact in order to trigger recognition of the context, wherein identifying the information is based at least on a relationship in the user information graph between the triggering fact and one or more other facts in the user-information graph.

11. The method of claim 10, wherein the triggering fact includes one or more previous interactions, by the user, with the browser application.

12. The method of claim 10, wherein the triggering fact includes a previous interaction, by the user, with a computer service other than the browser application.

13. The method of claim 10, wherein the relationship in the user-information graph between the triggering fact and the one or more other facts in the user information graph is a temporal relationship.

14. The method of claim 10, wherein recognizing the triggering fact includes assessing, for a candidate fact, a signal strength score indicating a strength of relationship between the candidate fact and facts in the user-information graph, and recognizing the triggering fact responsive to the signal strength score exceeding a threshold.

15. A system for providing contextual information to a user during a browsing session, comprising:
 a logic device; and
 a storage device configured to hold:
  a user-information graph including a plurality of facts associated with the user and derived from interaction by the user with a plurality of different computer services, wherein the user-information graph includes application-specific constituent graph structures associated with the plurality of different computer services, each application-specific constituent graph structure including edges connecting it to one or more other of the application-specific constituent graph structures, each application-specific constituent graph structure including a plurality of nodes; and
  instructions executable by the logic device to:
   recognize, based on a relationship between the application-specific constituent graph structures, a triggering fact in order to recognize a context of interaction with a browser application by a user; and
   identify information pertaining to the context, the information being based on the context and at least on one or more facts in the user-information graph, the information including a natural language description.

16. The system of claim 15, wherein the instructions are further executable to receive, from the browser application, a computer-readable description of one or more previous interactions, by the user, with the browser application, and wherein the triggering fact includes the computer-readable description of the one or more previous interactions.

17. The system of claim 15, wherein the triggering fact includes a description of a previous interaction, by the user, with a computer service other than the browser application.

18. The system of claim 15, wherein the relationship in the user-information graph between the triggering fact and the one or more other user-information facts in the user information graph is a temporal relationship.

19. The method of claim 15, wherein recognizing the triggering fact includes assessing, for a candidate fact, a signal strength score indicating a strength of relationship between the candidate fact and facts in the user-information graph, and recognizing the triggering fact responsive to the signal strength score exceeding a threshold.

20. The method of claim 15, wherein the information includes information based on one or more of 1) emails to or from the user, 2) contacts of the user, 3) calendar data of the user, 4) documents, 5) web pages, 6) location data associated with the user, and/or 7) application usage data associated with the user.

* * * * *